United States Patent [19]
Litton

[11] 3,808,892
[45] May 7, 1974

[54] MEASURING DEVICE
[76] Inventor: Garfield G. Litton, 1360 Ocean Parkway, Brooklyn, N.Y. 11230
[22] Filed: Dec. 3, 1971
[21] Appl. No.: 204,563

[52] U.S. Cl............... 73/427, 220/DIG. 5, 222/565
[51] Int. Cl............................................. G01f 19/00
[58] Field of Search... 73/426, 427; 220/20, DIG. 5, 220/4 E; 222/565; 30/324; 273/146; 33/104

[56] References Cited
UNITED STATES PATENTS
3,233,343   2/1966   Short.............................. 273/146 X
1,257,779   2/1918   Anderson........................... 273/146
3,208,754   9/1965   Sieve................................. 273/146

Primary Examiner—Richard C. Queisser
Assistant Examiner—Daniel M. Yasich
Attorney, Agent, or Firm—Burgess, Ryan & Wayne

[57] ABSTRACT

A measuring device having flat connected sides with depressions formed therein. Each depression corresponds to a different measuring volume such as a tablespoon or a teaspoon, and the measuring device can be provided in either solid or hollow form.

3 Claims, 10 Drawing Figures

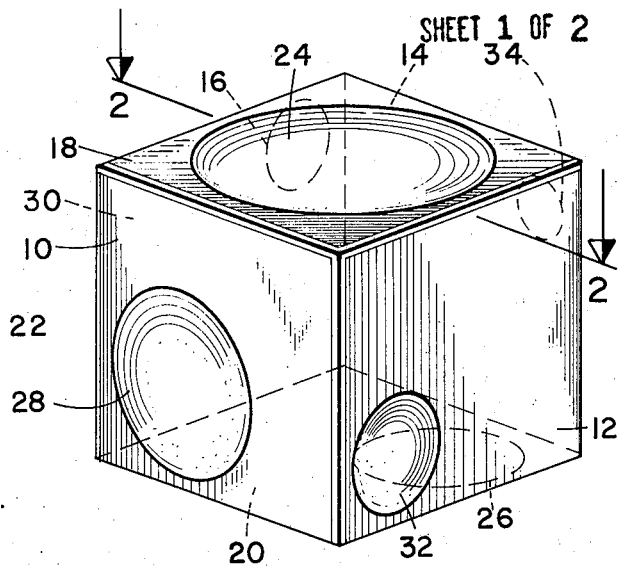
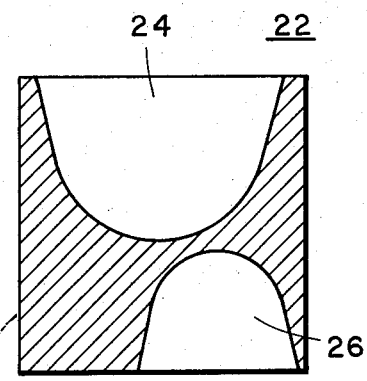
Fig. 1  Fig. 2
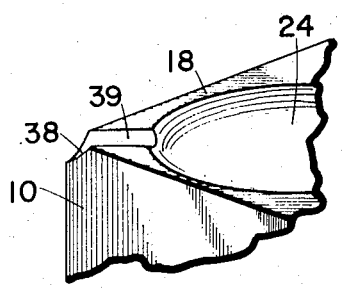
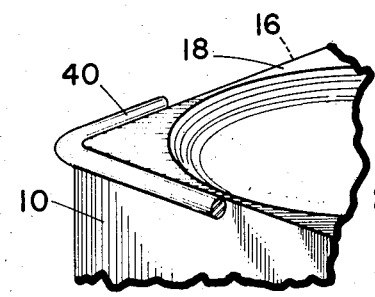
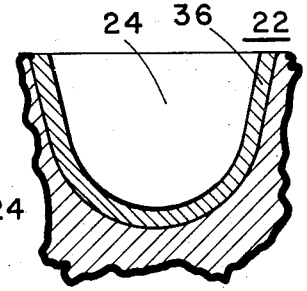
Fig. 4  Fig. 5  Fig. 3
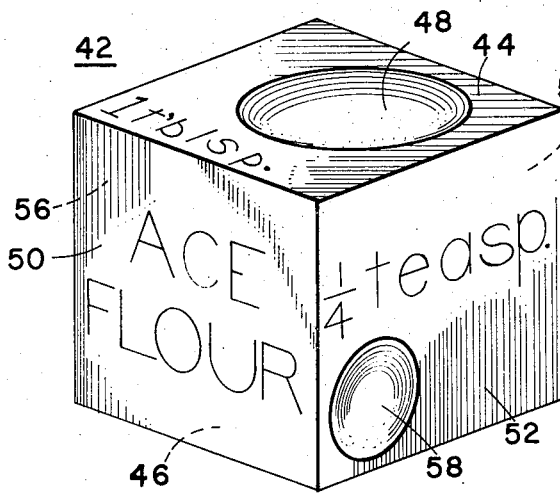
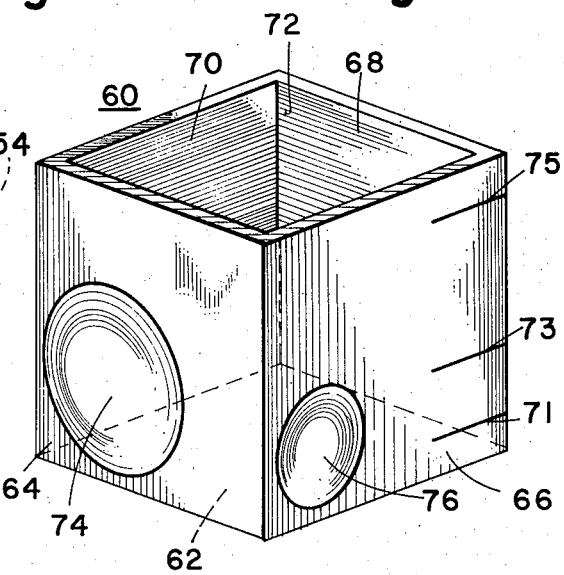
Fig. 6  Fig. 7

MEASURING DEVICE

BROAD STATEMENT OF INVENTION

The present invention relates to a measuring device and is particularly concerned with an integral unit having flat sides with depressions individually formed therein to measure specific volumes.

BACKGROUND OF THE INVENTION

It is desirable to have a compact integral device for measuring volumes of the type such as a teaspoon or a tablespoon for purposes such as in cooking. It has been known to provide a series of spoons of varying measuring volume and all linked together at their remote ends to form a connected series. With such an arrangement of spoons it would be possible to individually select different measures, such as a ¼ teaspoon, ½ teaspoon or 1 tablespoon when desired. However, the use of all these various spoons created difficulties with the spoons being loose when making a measure, and often the common connection would be broken and the individual measuring spoons would separate and be difficult to collect or become lost. Accordingly, it is clear that if a compact single unit without relatively moving parts could be provided that would have the same collection of measures, this would be a considerable improvement over the prior art. Such a measuring device would be an asset in the kitchen since there would be no problem as to separation of the different measures, and it could be placed on a shelf rather than in a drawer so that it would be more easily available. Such a device would be of benefit in the kitchen or in the bathroom or in the laboratory whenever measure of liquids or powders is desired.

According to the present invention a novel measuring device is provided as an integral unit of polyhedron shape having flat connected sides with a plurality of individual depressions respectively formed in the sides.

Another provision of the present invention is a novel measuring device having connected flat sides in which each side has a depression therein for measuring a volume different from any other depression.

A further provision of the present invention is a novel measuring device having six square sides perpendicularly arranged with respect to each other to form a cube with a depression of varying volume formed in each one of the sides.

Still another provision of the present invention is a novel measuring device formed of flat sides arranged perpendicularly to each other with one side open allowing the measuring device to be used as a container of predetermined volume and the other sides having individual depressions formed therein.

A further provision of the present invention is to provide a novel measuring device having connected sides of planar form arranged perpendicularly to each other so that a hollow body is formed by the connected sides in the shape of a cube with individual depressions formed in the sides.

Still another provision of the present invention is to provide a novel measuring device having connected sides of flat triangular shape with depressions of varying volume formed respectively in each side.

The nature of the present invention will become more clearly apparent and better understood from the following description and accompanying drawings in which:

FIG. 1 is a perspective view of a first embodiment of the present invention;

FIG. 2 is a sectional view taken along line II—II of FIG. 1;

FIG. 3 is a view similar to FIG. 1 with part of the structure broken away to show a second embodiment of the present invention;

FIG. 4 is a perspective view of a corner of the measuring device showing a pouring lip;

FIG. 5 is a view of a corner of the measuring device showing the addition of an integral bead to assist in pouring;

FIG. 6 is a perspective view of a further embodiment of the present invention;

FIG. 7 is a perspective view of a still further embodiment of the present invention;

DETAILED DESCRIPTION OF THE INVENTION

Figure 8:
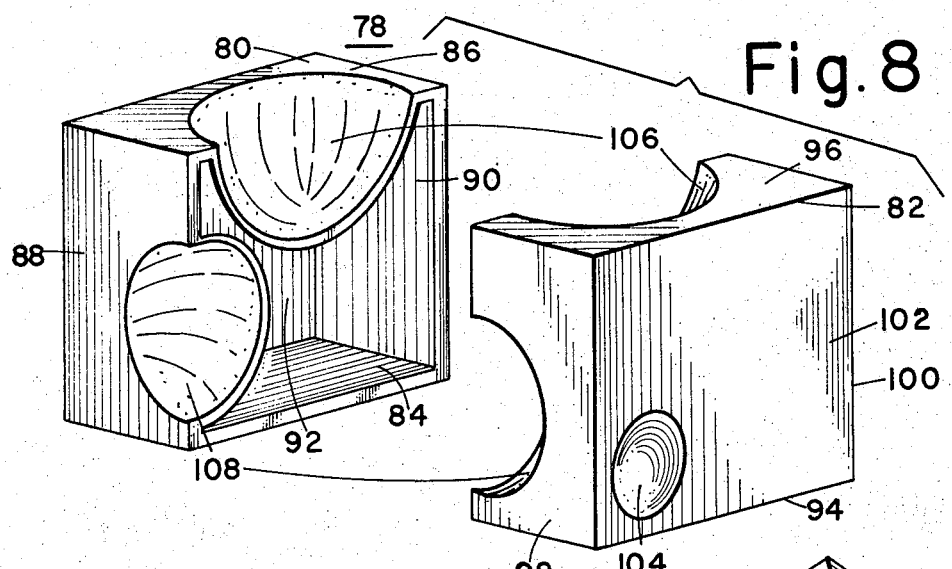
FIG. 8 is a perspective view in exploded form of still another embodiment of the present invention.
Figure 9:
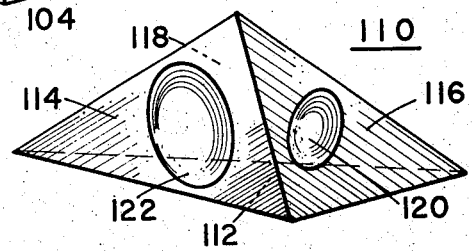
FIG. 9 is a perspective view of a still further embodiment of the present invention.

It will be understood that the accompanying drawings are merely diagrammatic illustrations, and reference should be made to the following description for a more detailed explanation of the structue involved. FIG. 1 illustrates a first embodiment of the novel measuring device having a polyhedron shape which is shown in this Figure as a cube formed by six square sides 10, 12, 14, 16, 18 and 20. Although any one of the sides could constitute the bottom side, top side or connecting side, for purposes of description of the FIG. 1 embodiment the side 20 will be identified as the bottom side and side 18 will be identified as the top side. The remaining sides 10, 12, 14 and 16 extend to connect top and bottom sides 18, 20 in the position of the measuring device shown in FIG. 1. As illustrated, the measuring device of the FIG. 1 embodiment is shown as a solid cube identified by the numeral 22. However, it will be understood that within the concept of the present invention the shape could be changed, as shown by the embodiment of FIG. 9 and the measuring device could be hollow as shown in FIGS. 7 and 8. A feature of the invention is that the device stands by itself and need not be held as the measure is added.

Measuring cube 22 can be formed of a variety of materials. For example, cube 22 can be molded from thermoplastic material with the depressions formed at the time of molding. Cube 22 also could be cast of metal, and it could be cast or molded in either solid or hollow form. The particular embodiment of FIG. 1 is formed of wood as shown in section in FIG. 2, and it has been found that rosewood is particularly satisfactory with the depressions formed in the sides or faces being removed by a cutting tool.

In each of the six faces of the wood block 22 an individual depression is formed with each depression having a volume different from every other depression volume and each measuring depression being of the size generally found in measuring devices of the kitchen, medicine cabinet or laboratory. For example, top side or face 18 has the largest depression identified by the numeral 24 which is carefully formed to have a volume of 1 tablespoon. Face 20 includes a depression 26 which is carefully formed to have a volume equivalent to 1 teaspoon. Face 10 includes a depression 28 which is carefully formed to have the volume of 3/4 teaspoon. Face 16 includes a depression 30 which is carefully formed to have a volume equivalent to ½ teaspoon. Face 12 includes a depression 32 which is carefully formed to have a volume equivalent to ¼ teaspoon, and face 14 includes a depression 34 which is carefully formed to have a volume equivalent to 1/8 teaspoon. The orientation of the depression is important with the tablespoon measure located in a surface directly opposite the teaspoon measure and the other measures located as desired above. This provides the measuring device with the smallest volume as the depressions are formed therein.

It is clear from the above description and an examination of FIG. 1 that a compact integrated single solid measuring device is provided with no moving parts that can be detached or lost and with all measuring volumes available in this single unit. The size of the measuring cube is determined by the volume necessitated by the largest depression. This is tablespoon depression 24 and it is seen that it fills most of the top fact 18. The other measuring depressions are smaller, and it will be noted that each smaller depression is located close to intersecting edges of the respective face in which it is formed. By positioning a measuring depression adjacent to an edge, it is easier to pour off the included liquid or powder that is being measured, and this feature will be explained further with respect to FIGS. 4 and 5.

Further advantages of the invention are clear from an examination of FIG. 1. As mentioned before, any side or face of cube 22 can be utilized as the bottom side for setting down the cube when it is not being used. Whereas in the prior art when individual spoons had to be used, such spoons would generally be kept in a drawer. However, a cube-shaped device as shown in FIG. 1 becomes a novel and decorative item that can be kept on a shelf in he kitchen, medicine cabinet or laboratory so that it is easily accessible, and there is no problem in finding the pariticular measurement needed. The novel measuring device also can act as a display, as it has been found that placing the cube on a shelf or a desk generates an intriguing presentation. In fact, when made of a plastic material such as Lucite or clear Lexan (which can be handled in a diswasher at elevated temperatures), then each depression can be seen from every side, and a most unusual and ornamental effect is produced. When manufacturing the measuring cube from plastic material, it is obvious that a most inexpensive item can be produced as compared to a series of spoons, and the novel measuring device can even be furnished as a give-away item to consumers.

Another embodiment of the invention is shown in FIG. 3 in which an insert 36 is provided to line each measuring depression. For example, the tablespoon depression 24 is shown in FIG. 3 with the lining 36 inserted therein for protective purposes. In the embodiment shown in FIGS. 1–3 it has been explained that the measuring cube 22 could be formed from a block of wood, and the lining 36 which would be placed in each depression could be made of plastic or a non-corrosive metal to protect the wood from the various liquids or powders that are measured.

Although each depression could be of any shape as long as the desired volume is formed thereby, in practice it has been found tht a constant curvature shape of partially spherical or parabolic form is most easily formed in each face, and this is the shape preferred and clearly illustrated in FIGS. 2 and 3.

FIG. 4 shows a corner of the measuring cube 22 wherein a pouring spout 38 is formed. It is to be appreciated that when a measuring depression such as depression 24 is filled with one tablespoon of liquid, it then is tipped to allow the liquid to pour off, and the provision of a spout 38 leading from a connecting groove 39 formed in the corner as shown will assist and direct the flow. The groove 39 is sufficiently small to maintain surface tension to hold back liquid in the depression until pouring is desired. A preferred size of groove 39 is 0.020 inch wide and 0.050 inch deep.

FIG. 5 shows another embodiment for improving the pouring off of liquid from a corner of the measuring cube, and this involves the provision of a bead 40. This bead 40 is a thin tubular element that is bent around and fastened to the corner as shown in FIG. 5 and allows the liquid poured to pass thereover without splattering or dribbling down faces 10 or 16. Bead 40 can be originally separate from the measuring device, but preferably it is formed simultaneously therewith. It is within the purview of this invention to have other pouring means located on a corner of the cube to assist in improving the flow of liquid or powder from a measuring depression, and the embodiments of FIGS. 4 and 5 are merely illustrative for this purpose.

FIG. 6 illustrates a further embodiment of the present invention in which a measuring cube 42 is provided having a shape generally similar to the measuring cube of FIG. 1. As explained in connection with FIG. 1, the embodiment of FIG. 6 can be considered to have a top face 44 and a bottom face 46. Top face 44 includes a measuring depression 48 with a volume equivalent to 1 tablespoon as previously explained for FIG. 1, and bottom face 46 also includes a measuring depression, but it is not shown in FIG. 6 for the purposes of clarity. Four sides 50, 52 54 and 56 join top and bottom faces 44, 46 by perpendicular connections. In face 52 a measuring depression 58 is shown which corresponds to the depression 32 of FIG. 1 and is of a size equivalent to the volume of a ¼ teaspoon. Depressions equivalent to those shown in FIG. 1 would also appear in faces 54 and 56, but these have not been shown for the purposes of clarity. The differences in the embodiment of FIG. 6 from that of FIG. 1 is that the face 50 does not have a measuring depression located therein. Face 50 is a continuous planar surface which can have a marking, printing label or decalcomania placed thereon. As illustrated in FIG. 6, an advertisement such as "ACE FLOUR" could be added to face 50. The cube device of FIG. 6 could be utilized as a give-away item which would be given free to the consumer in order to distribute the advertising displayed on the plane surface of face 50.

FIG. 6 further illustrates marking or imprinting that could be placed adjacent to each depression. For example, side 52 which includes the ¼ teaspoon measurement 58, which corresponds to depression 32 in FIG. 1, could have the marking "¼ teasp." imprinted adjacent thereto as illustrated. Additionally, face 44 having the tablespoon depression 48 could have the marking "1 tblsp." imprinted adjacent to the depression as illustrated. Every other face having a depression could have a similar adjacent marking, as for example face 46 which would have the teaspoon depression could have the marking "1 teasp." These same markings could be used in the FIG. 1 embodiment and are recommended in the manufacture of the device so that there would be no question as to the particular measure to be selected. If the measuring block 22 or 42 were formed from wood, such markings could be printed thereon or cut into the wood. If the measuring device were formed from plastic or metal, the markings could be cast or molded into the face at the time of manufacture.

FIG. 7 illustrates a further embodiment of the present invention in which a five-sided cube-shaped device is provided. The device 60 of FIG. 7 is generally hollow, and this is provided by five square-shaped sides of which one side 62 can be considered the bottom side, and sides 64, 66, 68 and 70 extend perpendicularly upwardly from the edges of side 62 so as to form a generally cube-shaped hollow container. In effect, measuring device 60 is substantially the same shape as measuring cube 22 and 42 of the embodiments shown in FIGS. 1 and 6 except that it is hollow with one of the sides or faces removed. The advantages of providing the measuring device in the shape shown in FIG. 7 is that it can be easily molded of thermoplastic material with a minimum use of the material, and the device can act as a container having an internal predetermined measure, such as a fluid ounce as well as 1 tablespoon. It follows that if cube 60 is of a larger size, the volume of the container would be thereby increased to possibly 2 or 3 fluid ounces with appropriate markings along the sides for each ounce. In connection with the embodiment of FIG. 7 it would be desirable to use transparent or translucent plastic for the purpose of clearly seeing such ounce markings and the fluid within volume 72. In connection with the appropriate markings and preferred size for the embodiment of FIG. 7, markings 71, 73 and 75 are shown. Marking 71 could designate a volume corresponding to a tablespoon measure since this measure or depression may be the measure eliminated due to the open side. Marking 73 represents a volume of 1 ounce, and marking 75 represents a volume of 2 ounces.

It is to be understood that in the embodiment of FIG. 7 the five sides illustrated would each have an individual measuring depression therein although only two such depressions have been shown for the sake of clarity In side 64 measuring depression 74 is shown which would correspond to the 3/4 teaspoon measure 28 shown in FIG. 1. In side 66 measuring depression 76 is shown which corresponds to the ¼ teaspoon measure 32 of FIG. 1.

FIG. 8 represents a further embodiment of the invention wherein thermoplastic material is utilized to form a measuring cube, and for production purposes the cube is made in two sections that are subsequently connected to form a measuring cube. The measuring cube 78 of FIG. 8 comprises a half section 80 formed separately from another half section 82. Each half section can be molded as a shell in an injection molding machine, and the shells 80 and 82 are subsequently connected by a solvent seal or sonic welding process. In forming each shell 80 and 82 it is seen that five connected sides are involved with the measuring depressions formed therein in a manner similar to the embodiment of FIG. 7. As explained previously, although any one side can be considered the top or bottom side, for purpose of description it will be considered that shell 80 is formed with a bottom half side 84 and a top half side 86, half sides 88 and 90 and a full square side 92. Similarly, shell 82 is formed with a bottom half side 94, a top half side 96, half sides 98 and 100 and a complete square side 102. Within side 102 is formed a measuring depression 104 corresponding to the ¼ teaspoon measure 32 in FIG. 1 or measure 76 in FIG. 7. A a number of the other depressions are not shown in the sides for purposes of clarity but it will be seen that several depressions such as the tablespoon measure 106 is formed partly in face 86 of one shell 80 and partly in face 96 of the other shell 82 to become an integral depression when the shells 80 and 82 are connected together. Simiarly, measuring depression 108 representing the 3/4 teaspoon measure is formed partly in side 88 of shell 80 and partly in side 98 of shell 82 and joined together when the shells are connected.

The advantages of the embodiment of FIG. 8 is that lightweight shells of thermoplastic can be formed by the injection molding process, the completed measuring cube 78 is inexpensively manufactured and light in weight, and if the cube is made of transparent or translucent plastic, the ornamental and unique characteristics of the device are enhanced.

FIG. 9 is a further embodiment of the invention showing a measuring device 110 as a polyhedron in which each side is an equilateral triangle, and all sides are connected to each other as illustrated. Accordingly, a four-sided measuring device is provided, and although any one of the sides can be considered the bottom surface and can be so positioned, for the purposes of description, the device 110 of FIG. 9 can be considered to have a bottom triangular side 112 with three sides 114, 116 and 118 extending angularly upwardly therefrom and joined to each other as illustrated. In each of the four sides illustrated in FIG. 9 a measuring depression would be formed of the nature shown in the earlier described embodiment although it is to be appreciated that since as a feature of the present invention only one depression is formed in each side, there will be a total of only four depressions available in the embodiment of FIG. 9. Two of such depressions have been illustrated, and side 116 is seen to include the largest depression 120 which would constitute the tablespoon. Side 114 includes a depression 122 of smaller size that could be the teaspoon measure. The other two sides then would include measuring depressions of smaller volume. Since the upper sides of the arrangement of FIG. 9 are at an angle to the horizontal when the device rests on a surface, it is apparent that in use the device will be held, for example in the hand, so that the desired side in horizontal.

Figure 10:
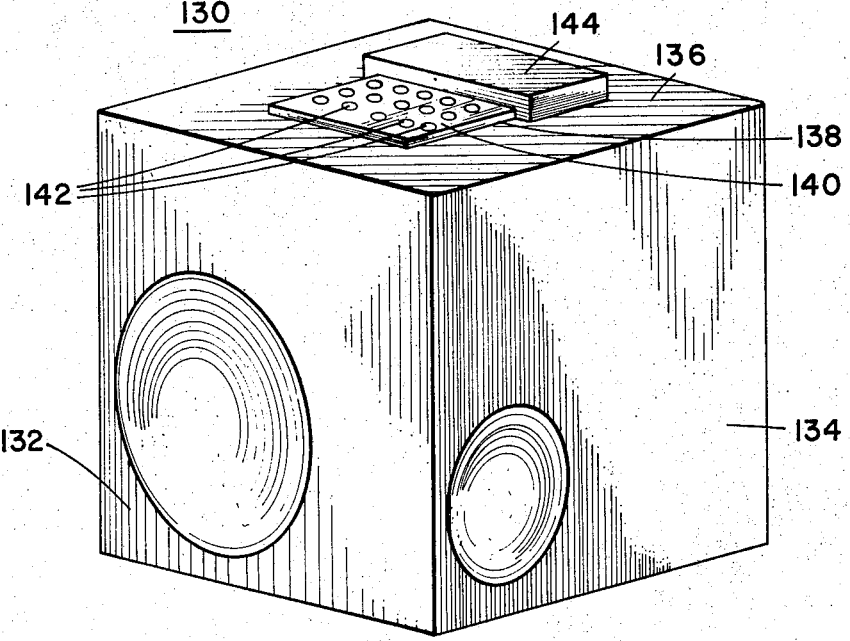
FIG. 10 is a perspective view of still another embodiment of the present invention.

FIG. 10 is a still further embodiment of the present invention wherein the measuring device 130 is a cube formed to be holoow as in the FIG. 8 embodiment. The sides 132 and 134 (and other sides not seen in this view) have depressions as illustrated and described before with respect to FIG. 8. The difference is that side 136 (considered the top side) does not include a measuring depression but instead includes an opening 138 which is closed by a cover 140. Half of cover 140 includes perforations 142, and a slider 144 is provided of a size to selectively cover half of cover 140. This allows measuring cube 130 to be used as a salt or seasoning shaker by filling the hollow volume with the seasoning and moving slider 144 to the illustrated position whereby overturning and shaking cube 130 allows the seasoning to pass out through perforations 142. Conversely, moving slider 144 to cover perforations 142 will completely close side 136 so that no seasoning will escape while cube 130 is used as a measure. As is conventional in salt shakers, another surface could have a filling plug (not shown) or cover 140 could be removable to add the salt or seasoning. Also, a twist device could be used to expose perforations 142 instead of slider 144.

The above description of the various embodiments has illustrated the novel concept of the invention involving the use of a cube or other polyhedron shape whereby measuring depressions are formed in side surfaces of a compact integral unit for use wherever liquid and powder measurements are required of the amount defined by the specific depression volumes.

It will be understood that various changes and modifications may be made by those skilled in the art in the particular embodiments of the measuring device which has been described above for illustrative purposes without departing from the scope of the invention as defined by the following claims.

What I claim is:

1. A device for measuring liquid or powder material comprising
   a plurality of flat sides, each side having an equal square shape and said sides being joined at their edges to form a cube with three sets of equal opposing sides;
   at least two of said sets of sides each having an individual concave depression formed therein; and
   each of said individual concave depressions having a different volume and a different peripheral surface in each respective side each said depression being located closely adjacent and between a pair of intersecting edges of the respective side in which it is joined.

2. A measuring device according to claim 1 in which at least part of an edge of each said depression is positioned closely adjacent to an edge corner of a respective flat side, and groove means forming a pouring spout extending from said edge to said corner.

3. A measuring device according to claim 1 in which at least part of an edge of each said depression is positioned closely adjacent to an edge corner of a respective flat side, and a bead is mounted to extend around said corner for a predetermined distance to permit a liquid to be poured from said device without splattering.

* * * * *